United States Patent [19]

Kooymans et al.

[11] Patent Number: 5,003,040
[45] Date of Patent: Mar. 26, 1991

[54] MODIFIED EPOXY RESINS

[75] Inventors: Petrus G. Kooymans; Werner T. Raudenbusch, both of Amsterdam, Netherlands

[73] Assignee: Shell Oil Company, Houston, Tex.

[21] Appl. No.: 457,430

[22] Filed: Dec. 27, 1989

[30] Foreign Application Priority Data

Dec. 29, 1988 [GB] United Kingdom ............... 8830343

[51] Int. Cl.$^5$ ...................... C08G 59/02; C08G 59/32
[52] U.S. Cl. ...................................... 528/407; 528/92; 528/111; 528/361
[58] Field of Search .................. 528/111, 92, 361, 407

[56] References Cited

U.S. PATENT DOCUMENTS

| | | | |
|---|---|---|---|
| 3,607,833 | 9/1971 | DeMoff et al. | 528/407 X |
| 3,763,097 | 10/1973 | Edelman | 528/407 X |
| 3,839,281 | 10/1974 | Dreher | 528/407 X |
| 3,948,916 | 4/1976 | Porret et al. | 528/407 X |
| 4,122,069 | 10/1978 | Meyer | 528/111 X |
| 4,537,946 | 8/1985 | Lohse et al. | 528/407 X |

FOREIGN PATENT DOCUMENTS 281213 9/1988 European Pat. Off.

Primary Examiner—Earl Nielsen

[57] ABSTRACT

Disclosed is a process for preparing an epoxy resin containing on average from 1.5 to 2.5 epoxy groups and at least one primary hydroxyl group per molecule, the method comprising reacting, in the presence of an etherification catalyst, tris(2-hydroxyethyl)isocyanurate with a diglycidylether having the general formula

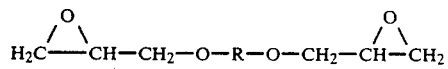

wherein R is an alkylene group, a cycloalkylene group, or an alkylene group containing a cyclic moiety.

8 Claims, No Drawings

MODIFIED EPOXY RESINS

BACKGROUND OF THE INVENTION

The present invention relates to a process for preparing modified epoxy resins particularly useful in outdoor coatings.

U.S. Pat. No. 3,763,097 describes a polyether resin which is prepared by heating, under acidic conditions, a reaction mixture of 0.5 to 8 equivalents of a cyclic 1,2-diepoxide with one equivalent of tris(2-hydroxyethyl)isocyanurate. The preferred epoxy resins are those in which the diepoxide is cycloaliphatic (including examples such as vinyl-cyclohexene dioxide, dicyclopentadiene dioxide, alicyclic diepoxy adipate, and alicyclic diepoxy carboxylate) or aromatic (including the diglycidyl ethers of aromatic bisphenols). Such epoxy resins are useful in making powder coatings, enamels and insulating varnishes.

There remains a need, however, for epoxy resins having a combination of flexibility and outdoor stability.

BRIEF DESCRIPTION OF THE INVENTION

According to the invention, a process is provided for preparing a modified epoxy resin, the process comprising contacting, in the presence of an etherification catalyst, a tris (2-hydroxyethyl) isocyanurate and a diglycidyl ether of the formula

in which R is alkylene, cycloalkylene or cyclic-substituted alkylene, under conditions effective for the production of a modified epoxy resin having an average of 1.5 to 2.5 epoxy groups and at least one primary hydroxyl group per molecule. The modified epoxy resins are particularly useful in surface coatings requiring UV and chemical resistance.

DETAILED DESCRIPTION OF THE INVENTION

Examples of suitable diglycidyl ethers of a polyhydric compound are diglycidyl ethers (hereinafter "DGEs") prepared from the reaction of an epihalohydrin with a saturated aliphatic or cycloaliphatic diol. The epihalohydrin is preferably epichlorohydrin. Preferably the diol is a saturated aliphatic diol having 4 to 8 carbon atoms, as in 1,4-butanediol, 1,5-pentanediol, 1,4-pentanediol, 2-methyl-1,4 butanediol, 2-ethyl-1,4-butanediol, 2,2-diethyl-1,4-butanediol, or a saturated cycloaliphatic diol having 5 to 12 carbon atoms, such as 1,3-cyclopentanediol, 3-ethyl-1,5-cyclononanediol, 2-methylol-5-ethylcyclohexanol. More preferably, the DGE is prepared from 1,6-hexanediol, 2,2-dimethyl-1,3-propanediol, or 1,4-methylolcyclohexane. The DGEs are, however, not restricted to compounds prepared from the reaction of an epihalohydrin with a diol, but may also stem from other syntheses such as, for example, the epoxidation of the reaction product of an allylether of one of the above diols.

The modified epoxy resins produced by the invention process are preferably prepared from 0.5 to 8 equivalents of a DGE per equivalent of tris(2-hydroxyethyl)isocyanurate (hereinafter "THEIC"). (An equivalent of a DGE in grams is the molecular weight of the DGE divided by two, and an equivalent of THEIC in grams is the molecular weight divided by three.) If more DGE is used, thermal stability decreases, and if more THEIC is used, the resulting small epoxy functionality adversely affects the curing of the resin. An excellent balance of these opposing considerations is obtained by using 1 to 3 equivalents of a DGE per equivalent of THEIC, and this ratio is therefore most preferred.

A DGE and a THEIC may be reacted by heating and stirring the reaction mixture at 100° to 235 ° C. The reaction is continued until the desired epoxy group content is obtained, which is usually about 1.5 to 10 hours.

Examples of etherification catalysts include amines and Lewis acids, for example alkanoates and halides of iron, zinc, aluminum and boron, and alkali metal alcoholates of polyoxyalkylene polyols. According to the preferred embodiment of the present invention a tin salt, e.g., tin dichloride or tin tetrachloride, is used as an etherification catalyst. The tin salt is preferably a salt of an alkanoic acid, particularly one having in the range of from 2 to 30 carbon atoms per molecule. Preferred catalysts are tin salts of alkanoic acids having from 2 to 20 carbon atoms. Tin(II)octoate is the most preferred catalyst.

The selection of relatively low temperatures reduces the risk of gel-formation during etherification of the epoxy resin. This is even more so when the temperature after preliminary heating to 100° C. is selected within the preferred range of from 140° to 185 ° C. Under these mild reaction conditions monitoring of epoxy group conversion and of primary hydroxyl group conversion can be carried out using standard titration methods or $^1$H-NMR. As indicated before, both epoxy group conversion and primary hydroxyl group conversion should be incomplete. For the epoxy groups the percentage conversion is preferably kept within the range of from 35 to 80% and for the primary hydroxyl groups the conversion is preferably kept within the range of from 60 to 85%.

The modified epoxy resins are particularly suitable for those applications where outdoor stability and flexibility are required. Attractive curing systems in this respect include acidic polyesters, aminoplast resins, reactive isocyanates, thiols, phenol-formaldehyde resins, bisphenolic curing agents, anhydride curing agents, polycarboxylic compounds and dicyandiamide. Amine curing agents are generally less suitable, since the more common amines may detrimentally affect the UV stability of the cured resin.

Suitable acidic polyester curing agents are those having more than two acidic hydrogens per molecule. The polyester may be an aliphatic, cycloaliphatic or aromatic polyester or it may be a reaction product of a polycarboxylic compound, i.e., polyacid or polyanhydride, with an epoxide. Adducts of trimellitic acid and 1,2-epoxybutane have been found to be very suitable polyesters for UV resistant cure application.

The relative proportions of modified epoxy resin and acidic polyester curing agent are those generally employed in the curable binder art, typically from 0.8 to 1.2 acidic-hydrogen equivalent per epoxy equivalent.

The reaction between the modified epoxy resin and the curing agent may be accelerated by addition of up to 5% wt based on the modified epoxy resin of common catalysts and/or accelerators. When an acidic polyester is used as curing agent, preferably an esterification catalyst is used such as disclosed in the Handbook of Epoxy Resins, Lee & Neville, McGraw-Hill, NY (1967), chapters 11-7. The catalyst or accelerator may be a strong organic or inorganic base, or an organic metal compound such as, for example, salts (e.g. octoates, acetates or naphtenates) of lead, zinc, calcium, barium, iron(III), tin(II), manganese, cobalt, dibutyltin, of the alkali and alkaline earth metals, of the lanthanides, and of zirconium, cadmium, chrome, and acetylacetonate complexes of titanium, lead, zinc, cadmium, cerium, thorium and copper. Mixtures of such salts and/or complexes may be used. Particularly preferred are the alkanoates, for example chrome alkanoates such as chrome(III)octoate. The most preferred catalyst is CORDOVA ACCELERATOR AMC-2 (registered trademark).

The present invention may be employed for stoving lacquers, powder coatings, and electrodeposition coatings. The modified epoxy resins of the invention are primarily intended to be employed in outdoor surface coatings. Other applications, e.g., those in which the cured resin must be stable against UV, high energy radiation or ozone, are also possible. The resins may be blended with conventional solvents such as volatile aliphatic or aromatic hydrocarbons. Examples of suitable solvents are ketones and/or glycolethers, such as mixtures of methylisobutyl ketone and butylOXITOL (registered trademark). Pigments, fillers, dispersing agents and other components known in the art of surface coating formulations may be added as well to the curable resin systems comprising modified epoxy resins made in accordance with the process of this invention.

EXAMPLES

The epoxy resins summarized in Table 1 were prepared as follows:

The DGE and THEIC were charged to a suitable glass reactor equipped with stirrer, reflux condenser and thermometer or thermocouple. The ingredients were heated with appropriate agitation to 100° C., and the catalyst tin(II)octoate was added. Then, the temperature was increased to the reaction temperature (175° C.). The course of the reaction was followed by withdrawing samples at regular intervals and determining the epoxy group content (EGC) value. When the desired EGC was reached, the reaction was stopped by cooling to room temperature.

TABLE 1

Preparation of Epoxy Resin Containing Primary Hydroxyl Groups

| Ex.* No. | Triol (g) | Triol (eq. OH) | Epoxy resin (g) | Epoxy resin (eq. EP) | Tin (II) octoate (g) | Tin (II) octoate (% w) | Reaction cond. h/175° C. | Final EGC meq/g |
|---|---|---|---|---|---|---|---|---|
| 1** | 261 | 3 | 768 | 4 | 2.57 | 0.25 | 7.5 | 2.03 |
| 2** | 261 | 3 | 768 | 4 | 5.14 | 0.5 | 3.5 | 1.96 |
| 3 | 261 | 3 | 470 | 4 | 3.66 | 0.5 | 4.0 | 2.76 |
| 4 | 522 | 6 | 705 | 6 | 6.14 | 0.5 | 6.0 | 1.70 |
| 5 | 261 | 3 | 445 | 4 | 1.77 | 0.25 | 5.0 | 2.83 |
| 6 | 261 | 3 | 512 | 4 | 1.93 | 0.25 | 4.5 | 2.59 |
| 7 | 522 | 6 | 768 | 6 | 6.45 | 0.5 | 5.5 | 1.58 |

*1, 2 = Tris(hydroxyethyl)isocyanurate (THEIC) and diglycidylether (DGE) of bisphenol-A (BPA).
3, 4 = THEIC and DGE of 1,6-hexanediol (HD).
5 = THEIC and DGE of neopentylglycol.
6, 7 = THEIC and DGE of 1,4-cyclohexanedimethanol (CHDM).
**For comparison only.

(b) From the modified epoxy resins, nos. 2, 3, 5 and 6 (TABLE 1) were selected for evaluation in heat-cured coating systems using a trimellitic anhydride/1,2 epoxybutane adduct having an acid value of about 3.8 meq/g on solids as curing agent and CORDOVA ACCELARATOR AMC-2 (registered trademark) as catalyst. The selected resins were mixed with the curing agent (epoxy/carboxyl ratio 1/1). The catalyst was added and the mixture was thinned with a solvent blend of butylOXITOL/methyl isobutyl ketone (butylOXITOL is a registered trademark) to 50% solids. The lacquers were applied by means of bar coaters onto steel panels and cured at 160° C. for 20 minutes. The bar coaters were selected in such a way that after stoving the film had a thickness of 20 to 25 μm. The performance of the different coatings is shown in Table 2.

TABLE 2

Performance of Systems Based on Modified Epoxy Resins

| | Epoxy resin (Table 1) No. | | | |
|---|---|---|---|---|
| | 2* | 3 | 5 | 6 |
| Formulation details | | | | |
| Epoxy resin (g) | 75 | 75 | 75 | 75 |
| TMA/EB polyester (g) | 40 | 55 | 56 | 52 |
| Catalyst AMC-2 (g) | 0.29 | 0.32 | 0.33 | 0.31 |
| ButylOXITOL/MIBK 1/1 (g) | 77 | 86 | 87 | 84 |
| Epoxy/carboxyl ratio | 1/1 | | | |
| Solids content | 60% | | | |
| Film properties | | | | |
| Film thickness | 24 | 22 | 23 | 24 |
| Gloss Gardner (60° C.)$^a$ | >100 | >100 | >100 | >100 |
| (45° C.)$^a$ | 70 | 76 | 76 | 81 |
| MEK resistance$^b$ | >100 | >100 | >100 | >100 |
| Erichsen hardness | 211 | 61 | 210 | 203 |
| Erichsen reverse impact | 40 | >80 | 40 | 70 |
| UV resistance | poor | good | good | good |

*For comparison only.
$^a$Calibrated using black calibration panel (= gloss 53)
$^b$Double rubs passed Via the process described it is possible to prepare a range of UV-resistant epoxy resins containing on average 1.5 to 2.5 epoxy groups and at least one primary hydroxyl group per molecule. Cured matrices of these resins show equal or improved mechanical and chemical properties and good UV resistance in comparison with the reference resins 1 and 2 (Table 2).

We claim:

1. A process for preparing a modified epoxy resin, the process comprising contacting, in the presence of an effective amount of an etherification catalyst, from about to about 3 equivalents of a diglycidyl ether of the formula

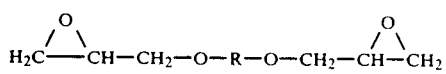

wherein R is alkylene, cycloalkylene or cyclo-substituted alkylene, per equivalent of tris(2-hydroxyethyl) isocyanurate, under conditions effective to produce a modified epoxy resin having an average of 1.5 to 2.5 epoxy groups and at least one primary hydroxyl group per molecule.

2. The process of claim 1 wherein R is an alkylene group having 4 to 8 carbon atoms, a cycloalkylene group having 5 to 12 carbon atoms, or an alkylene group containing a cyclic moiety and having 5 to 12 carbon atoms.

3. The process of claim 2 wherein the diglycidyl ether is derived from at least one of 1,6-hexanediol, 2,2-dimethyl-1,3-propanediol, and 1,4-dimethylolcyclohexane.

4. The process of claim 4 wherein the etherification catalyst is tin(II)octoate.

5. The process of claim 1 wherein the diglycidyl ether is a diglycidyl ether of 1,6-hexanediol.

6. The process of claim 4 wherein the etherification catalyst is tin(II)octoate.

7. The process of claim 6 wherein the diglycidyl ether and the tris(2-hydroxyethyl)isocyanurate are contacted at a temperature within the range of 100° to 235° C.

8. The process of claim 7 wherein the diglycidyl ether and the tris(2-hydroxyethyl)isocyanurate are contacted at a temperature within the range of 140° to 185° C.

* * * * *